US 8,831,595 B2

(12) United States Patent
Uchida et al.

(10) Patent No.: US 8,831,595 B2
(45) Date of Patent: Sep. 9, 2014

(54) WIRELESS COMMUNICATION SYSTEM AND MONITORING APPARATUS SELECTABLE OPTIMUM WIRELESS COMMUNICATION METHOD

(75) Inventors: Tsutomu Uchida, Yokohama (JP); Seishi Hanaoka, Tokyo (JP); Masashi Yano, Kawasaki (JP); Naruhito Nakahara, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1539 days.

(21) Appl. No.: 12/010,058

(22) Filed: Jan. 18, 2008

(65) Prior Publication Data
US 2008/0233951 A1 Sep. 25, 2008

(30) Foreign Application Priority Data

Mar. 19, 2007 (JP) ................. 2007-070252

(51) Int. Cl.
*H04W 24/00* (2009.01)
*H04W 48/18* (2009.01)
*H04W 92/12* (2009.01)
*H04W 48/00* (2009.01)
*H04W 92/02* (2009.01)
*H04W 88/06* (2009.01)
*H04W 88/14* (2009.01)
*H04W 92/22* (2009.01)

(52) U.S. Cl.
CPC .............. *H04W 48/18* (2013.01); *H04W 92/12* (2013.01); *H04W 48/17* (2013.01); *H04W 92/02* (2013.01); *H04W 88/06* (2013.01); *H04W 88/14* (2013.01); *H04W 92/22* (2013.01)
USPC ........ 455/425; 455/435.1; 455/418; 455/574; 455/456; 455/67.13; 455/437; 455/422.1; 455/456.1; 455/41.2

(58) Field of Classification Search
CPC ..... H04W 24/06; H04W 24/00; H04W 24/08; H04W 88/02; H04W 92/12; H04W 88/08
USPC .............. 370/331, 236.2, 235, 310, 338, 389; 455/410, 425, 406, 418, 552.1, 466, 455/432.1, 434, 422.1, 419, 424, 452.2
See application file for complete search history.

(56) References Cited

U.S. PATENT DOCUMENTS

| 7,782,964 B1 * | 8/2010 | Talley et al. ................. 375/260 |
| 8,330,580 B2 * | 12/2012 | Reynolds et al. ............. 340/10.2 |
| 2005/0083866 A1 * | 4/2005 | Kubotani et al. ............. 370/310 |
| 2005/0197101 A1 * | 9/2005 | Gupta ........................... 455/410 |
| 2005/0262268 A1 * | 11/2005 | Furukawa et al. ............ 709/245 |

(Continued)

OTHER PUBLICATIONS

"Draft IEEE Standard for Local and Metropolitan Area Networks: Media Independent Handover Services", IEEE P802.21 D00.04, Dec. 2005, pp. i-vi and 1-131.

*Primary Examiner* — Joseph Arevalo
(74) *Attorney, Agent, or Firm* — Crowell & Moring LLP

(57) ABSTRACT

In a wireless communication system including a plurality of base station controllers different in wireless communication method, each of which accommodates a plurality of base stations, a home agent apparatus connected to the base station controllers, and a monitoring apparatus connected to each of the base stations and the base station controllers, the monitoring apparatus acquires communication quality information of each wireless terminal from each of the base stations, and selects a wireless base station having a wireless communication path suitable for the wireless terminal from among wireless base stations different in communication method to which the wireless terminal is connected.

9 Claims, 15 Drawing Sheets

TERMINAL INFORMATION TABLE 500

| | | | |
|---|---|---|---|
| 501 — HoA | | 10.0.0.1 | |
| 502 — TERMINAL ID INFORMATION | UATI | 100 | — 502A |
| | IP ADDRESS FOR IPsec | 192.168.0.1 | — 502B |
| | MAC ADDRESS (Wi-Fi) | 01.02.03.04.05.06 | — 502C |
| | MAC ADDRESS (WiMAX) | 01.02.03.04.05.06 | — 502D |
| | WIRELESS COMMUNICATION METHOD | BASE STATION ID | COMMUNICATION QUALITY INFORMATION |
| 503 — | 1xEV-DO | ID20-1 | 10 — 503A |
| | Wi-Fi | ID30-1 | 50 — 503B |
| | WiMAX | ID40-1 | 30 — 503C |
| 504 — OPTIMUM WIRELESS PATH (OPTIMUM BASE STATION INFORMATION) | | ID20-1 | |

(56) References Cited

U.S. PATENT DOCUMENTS

| | | |
|---|---|---|
| 2006/0092864 A1* | 5/2006 | Gupta et al. .................. 370/278 |
| 2006/0159047 A1* | 7/2006 | Olvera-Hernandez et al. ............................ 370/331 |
| 2006/0268718 A1* | 11/2006 | Jones ............................ 370/235 |
| 2007/0160049 A1* | 7/2007 | Xie et al. ...................... 370/390 |
| 2007/0183333 A1* | 8/2007 | Kaur et al. ................. 370/236.2 |
| 2007/0208864 A1* | 9/2007 | Flynn et al. ................... 709/227 |
| 2008/0095158 A1* | 4/2008 | Nakazawa et al. ............ 370/389 |
| 2010/0020775 A1* | 1/2010 | Tomizu ........................ 370/338 |

* cited by examiner

1xEV-DO BASE STATION 20-1

FIG.9

TERMINAL INFORMATION TABLE 500

| | | | |
|---|---|---|---|
| 501 | HoA | | 10. 0. 0. 1 |
| 502 | TERMINAL ID INFORMATION | UATI | 100 — 502A |
| | | IP ADDRESS FOR IPsec | 192. 168. 0. 1 — 502B |
| | | MAC ADDRESS (Wi-Fi) | 01. 02. 03. 04. 05. 06 — 502C |
| | | MAC ADDRESS (WiMAX) | 01. 02. 03. 04. 05. 06 — 502D |
| | WIRELESS COMMUNICATION METHOD | BASE STATION ID | COMMUNICATION QUALITY INFORMATION |
| 503 | 1xEV-DO | ID20-1 | 10 — 503A |
| | Wi-Fi | ID30-1 | 50 — 503B |
| | WiMAX | ID40-1 | 30 — 503C |
| 504 | OPTIMUM WIRELESS PATH (OPTIMUM BASE STATION INFORMATION) | | ID20-1 |

FIG.10

SYSTEM CONFIGURATION
INFORMATION TABLE 600

| WIRELESS COMMUNICATION METHOD | BASE STATION ID | THROUGHPUT | NUMBER OF TERMINALS |
|---|---|---|---|
| 1xEV-DO | ID20-1 | | |
| | ID20-2 | | |
| | ⋮ | | |
| Wi-Fi | ID30-1 | | |
| | ID30-2 | | |
| | ⋮ | | |
| WiMAX | ID40-1 | | |
| | ⋮ | | |

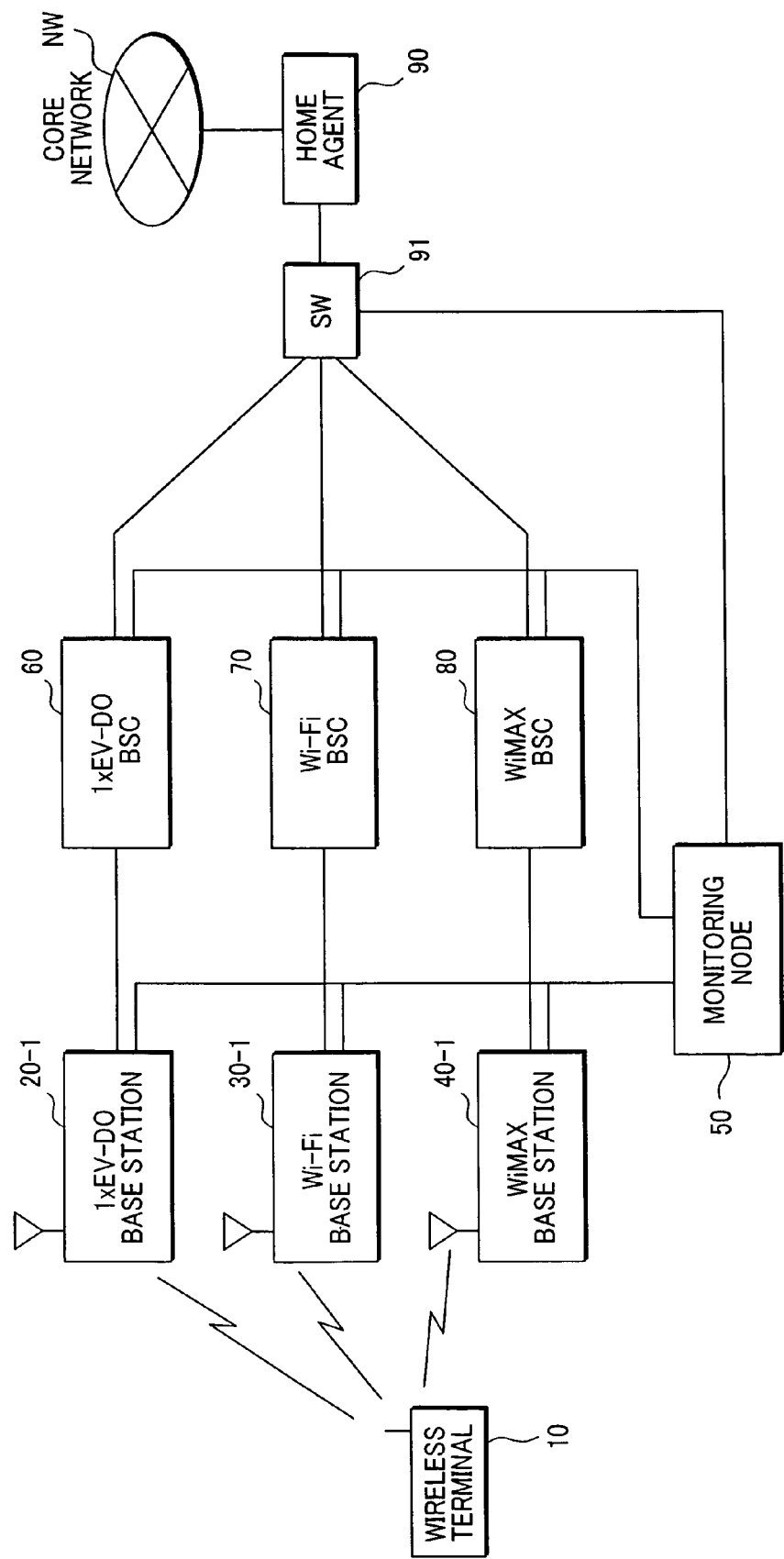

WIRELESS COMMUNICATION SYSTEM AND MONITORING APPARATUS SELECTABLE OPTIMUM WIRELESS COMMUNICATION METHOD

CLAIM OF PRIORITY

The present application claims priority from Japanese application serial No. 2007-070252, filed on Mar. 19, 2007, the content of which is hereby incorporated by reference into this application.

BACKGROUND OF THE INVENTION (1) Field of the Invention

The present invention relates to a wireless communication system, and more particularly to a mobile wireless communication system including a plurality of wireless base stations and base station controllers different in wireless communication method, and a monitoring apparatus.

(2) Description of Related Art

Recently, with the development of wireless communication technology, many types of mobile wireless communication systems different in communication method in terms of use frequency bands and modulation/demodulation method are proposed. For example, as a cellular communication system that applies the CDMA technology, a technical specification 1xEV-DO (1X Evolution Data Only) specific to data communication is known. The 1xEV-DO is included in cdma 2000 standards of wideband CDMA (W-CDMA) and enables data communication of up to 2.4 Mbps in a band of 1.25 MHz.

As a wireless communication system for hot spot, for example, there is Wi-Fi (Wireless Fidelity) proposed in IEEE802.11 belonging to standards of wireless LAN. As a wireless communication system suitable to broadband connection service in regions of relatively low population density, there is wireless MAN (Metropolitan Area Network) of IEEE802.16 standards, which is called WiMAX (Worldwide Interoperability for Microwave Access).

In IEEE P802.21 D00.04, standardization activities concerning handover among different types of wireless networks are performed, adopting above-described W-CDMA, 1xEV-DO, Wi-Fi, and WiMAX as mobile wireless communication methods eligible for handover to perform. The hand over of IEEEP802.21 D00.04 is called MIH (Media Independent Handover).

In recent years, a wireless communication system called "cognitive wireless" is studied. This system enables each wireless terminal or each wireless base station to select the most efficient mobile communication method in terms of frequency use efficiency and throughput characteristics by dynamically recognizing situations of wireless sections.

SUMMARY OF THE INVENTION

In MIH of IEEE P802.21 D00.04, a new layer called MIHF (MIH Function) is defined in order to achieve handover between different types of wireless networks. Therefore, the adoption of MIH would require partial change of standardization requirements for existing mobile wireless systems such as 1xEV-DO (CDMA2000) and addition of the function of MIHF layer, thereby increasing development costs.

An object of the present invention is to provide a wireless communication system in which a wireless terminal communicable by a plurality of different wireless communication methods can be connected to a core network through an optimum wireless communication path, without making major changes to existing wireless communication system.

Another object of the present invention is to provide a monitoring apparatus for a wireless communication system, which can select a wireless communication method with which a wireless communication path suitable for a wireless terminal is available, from among plural types of wireless communication methods.

In order to achieve the objects, a wireless communication system according to the present invention comprises: a plurality of base station controllers different in wireless communication method and each accommodating a plurality of base stations; a home agent apparatus connected to the base station controllers; and a monitoring apparatus (hereinafter referred to as a monitoring node) connected to each of the base stations and the base station controllers, wherein the monitoring node acquires communication quality information of each wireless terminal from each of the base stations, and selects one of the wireless base stations having a wireless communication path suitable for the wireless terminal, from among the wireless base stations different in communication method and connected to the wireless terminal.

A wireless communication system of the present invention is characterized in that a home agent or a packet forwarding apparatus located between the home agent and each base station controller is notified of a wireless communication method suitable for each wireless terminal from a monitoring node.

For example, it is assumed that a wireless terminal has three types of wireless communication functions 1xEV-DO, WiMAX, and Wi-Fi. Each of 1xEV-DO, WiMAX, and Wi-Fi complies with mobile IP, and an IP address assigned to the wireless terminal as a home address (HoA) is usable as a terminal ID common to these tree type of wireless communication methods. Therefore, if the monitoring node can acquire communication quality information of the wireless terminal from each wireless base station by designating the wireless terminal by HoA, the selection of a wireless communication path suitable for the wireless terminal must be easy.

However, in general, each base station identifies a wireless terminal by another ID different from HoA. For example, base stations of 1xEV-DO identify each wireless terminal by its UATI (Unicast Access Terminal Identifier), and base stations of Wi-Fi and WiMAX identify each wireless terminal by its MAC address. UATI and MAC address are terminal IDs specific to each wireless communication method. Accordingly, if the monitoring node receives a communication quality notification which identifies a wireless terminal by UATI from a 1xEV-DO base station and a communication quality notification which identifies a wireless terminal by a MAC address from a Wi-Fi base station, the monitoring node cannot compare the communication qualities because the IDs of the wireless terminals are different.

To solve this problem, in the wireless communication system of the present invention, the monitoring node includes: first means for acquiring, in the process of establishing a communication path performed between a wireless terminal and each of the base station controllers via one of base stations, a first terminal ID (e.g., UATI and MAC address) specific to a wireless communication method to be used by the base station to identify the wireless terminal, and a second terminal ID (e.g., HoA) to be used by a home agent apparatus to identify the wireless terminal, and storing, in association with the second terminal ID, a plurality of first terminal IDs used by a plurality of base stations connected with the wireless terminal and different in wireless communication method; second means for acquiring communication quality information for each wireless terminal from each of the base stations, and storing the communication quality information in association with the second terminal ID of the wireless terminal; and third means for selecting a wireless communication method with which a wireless communication path suitable for the wireless terminal is available, by comparing communication quality information of a plurality of base stations associated with the second terminal ID of the wireless terminal.

According to the present invention, since communication quality information acquired from a plurality of base stations different in wireless communication method is stored in association with a second terminal ID which is common to a plurality of wireless communication method, it is easy for the monitoring apparatus to compare the communication quality information, and to select a wireless communication method with which communication quality suitable for each wireless terminal is available. Moreover, since a wireless communication method available communication quality suitable for each wireless terminal can be notified to the home agent apparatus or packet forwarding apparatus by designating the wireless terminal by the second terminal ID, the home agent apparatus or packet forwarding apparatus can route packets received from a core network to a base station controller and a base station that adopt the optimum wireless communication method.

BRIEF DESCRIPTION OF DRAWINGS

FIG. 9 is a drawing showing an embodiment of table entry constituting a terminal information table 500 provided in a monitoring node 50;

FIG. 10 is a drawing showing an embodiment of table entries constituting a system configuration information table 600 provided in a monitoring node 50;

FIG. 16 is a drawing showing another configuration of a wireless communication network to which the present invention is applied.

DETAILED DESCRIPTION OF PREFERRED EMBODIMENTS

Hereinafter, embodiments of the present invention will be described with reference to the drawings.

Figure 1:
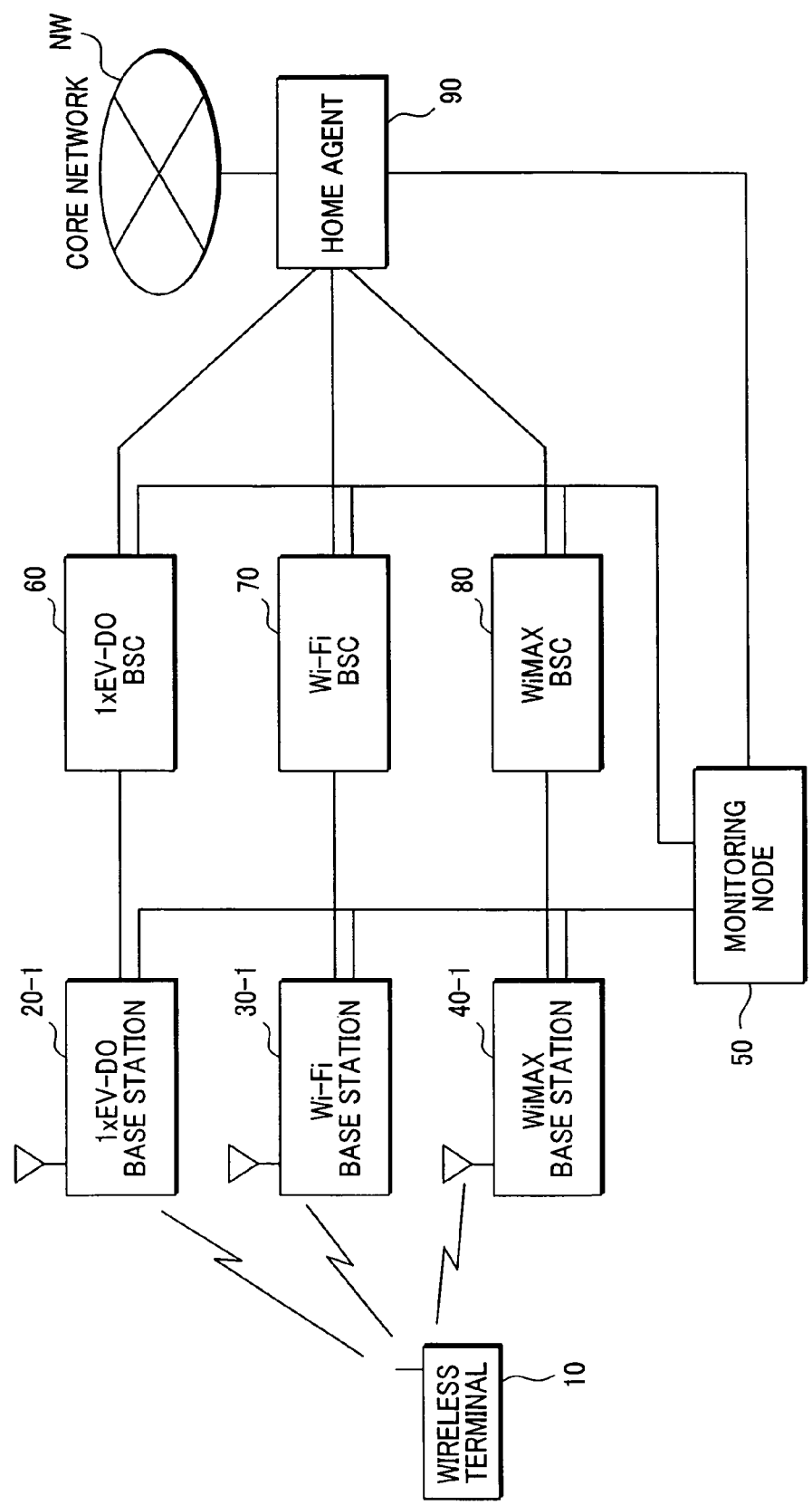
FIG. 1 is a drawing showing an example of a wireless communication network to which the present invention is applied.

FIG. 1 shows an embodiment of a wireless communication network to which the present invention is applied.

The wireless communication network shown here includes: a 1xEV-DO radio communication system comprising a 1xEV-DO base station 20-1 and 1xEV-DO base station controller (BSC) 60; a Wi-Fi wireless communication system comprising a Wi-Fi base station 30-1 and a Wi-Fi base station controller 70; a WiMAX wireless communication system comprising a WiMAX base station 40-1 and a WiMAX base station controller 80; and a monitoring node 50 and a home agent 90 each connected to these wireless communication systems.

Each of the base stations 20-1 to 40-1 forms a wireless communication area (cell) having breadth depending on its wireless transmission power and wirelessly communicates with a wireless terminal 10 within the wireless communication areas. As the wireless communication areas, the 1xEV-DO area, the WiMAX area, and the Wi-Fi area are smaller in that order. For simplicity of the drawing, base station 20-1, 30-1, and 40-1 are disposed here one for every wireless communication system. However, in an actual wireless communication system, each of the base station controllers 60, 70, and 80 can accommodate a plurality of base stations.

The wireless terminal 10 can establish wireless communication paths with plural types of base stations 20-1 to 40-1 within a communicable range. The home agent 90, which is connected to, for example, a core network NW such as the Internet and public communication networks, relays transmission packets from the wireless terminal 10 to the core network NW, and relays packets destined for the wireless terminal 10 and received from the core network to the wireless terminal 10 via any of the base station controllers 60, 70, and 80.

The monitoring node 50 is connected with the base stations 20 to 40, the base station controllers 60-80, and the home agent 90. As described later, the monitoring node 50 acquires, from the base stations 20 to 40 and the base station controllers 60 to 80, ID information of the wireless terminal 10 having established a wireless communication path, monitors communication quality between the wireless terminal 10 and the base stations 20 to 40, and selects an optimum path (wireless communication system) in a wireless section for each wireless terminal.

In this embodiment, the monitoring node 50 notifies the home agent 950 of an optimum path of each wireless terminal. Selection of optimum path is periodically carried out, and when the optimum path changes to another one as the wireless terminal 10 moves, the monitoring node 50 notifies the home agent 90 of a new optimum path of the wireless terminal 10. In an optimum path notification, the wireless terminal 10 is designated with a home address HoA, and the optimum path is specified with type information of a wireless communication system. The optimum path may be specified with ID of base station controller or base station. The home agent 90 stores correspondences between the IDs (HoA) of the wireless terminals 10 and ID information of optimum paths, and forwards a packet destined for the wireless terminals 10 to a base station controller to which a base station having the optimum path belongs.

Figure 2:
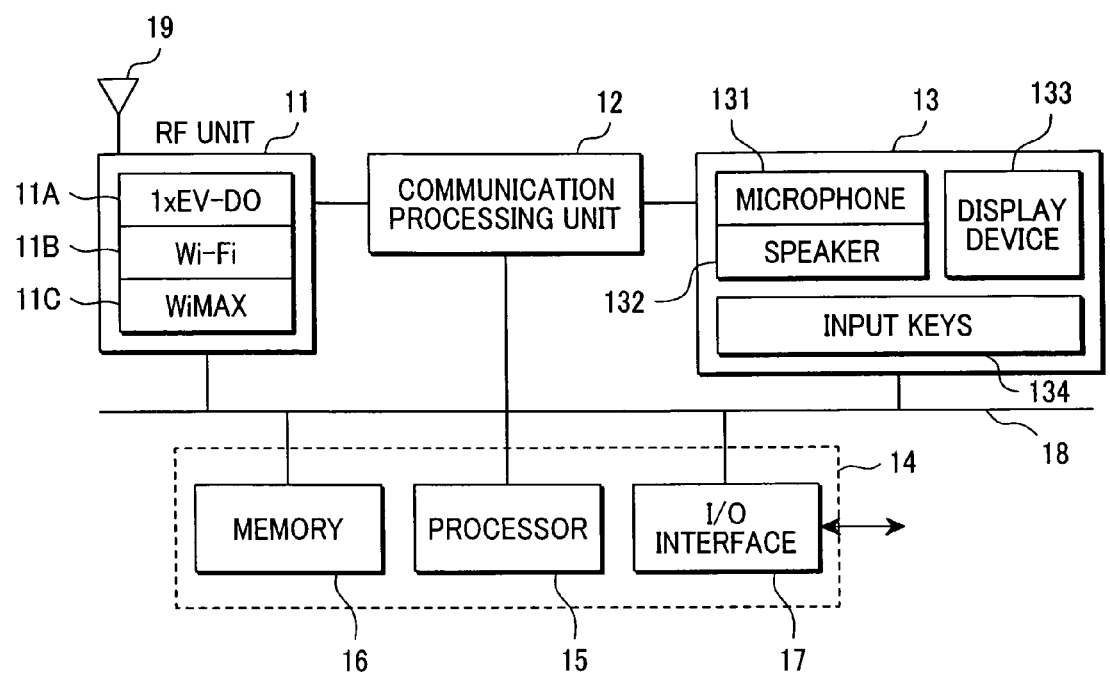
FIG. 2 is a block diagram showing an embodiment of wireless terminal 10.

FIG. 2 is a block diagram showing an embodiment of the wireless terminal 10.

The wireless terminal 10 comprises: an RF unit 11 provided with an antenna 19; a communication processing unit 12; a peripheral unit 13; a control unit 14; and an internal bus 18 for connecting these elements. The peripheral unit 13 includes a microphone for voice communication 131, a speaker 132, a display for data communication 133, and input keys 134. The input keys 134 may be a touch panel or pointing device, and may include a printing mechanism for printing display contents.

The RF unit 11 includes plural types of RF modules 11 and transmits and receives wireless signals to and from plural types of base stations different in wireless communication methods via the antenna 19. In this embodiment, the RF unit 11 includes 1xEV-DO module 11A, Wi-Fi module 11B, and WiMAX module 11C. The RF unit 11 converts a radio signal received through the antenna 19 into an electrical signal to output it to the communication processing unit 12, and converts a transmission signal inputted from the communication processing unit 12 into a radio signal and to transmit it from the antenna 19.

The communication processing unit 12 is provided with a communication processing function such as protocol processing for received signals and failure monitoring, and a function to encode and decode voice data. The communication processing unit 12 communicates control frames with the control unit 14, and voice data and text data with the peripheral unit 13.

The control unit 14 includes a processor (CPU) 15 for controlling the operation of the whole wireless terminal, a memory 16 for storing various programs to be executed by the processor 15 and data, and an input/output (I/O) interface 17 through which signals are communicated with external devices.

Figure 3:
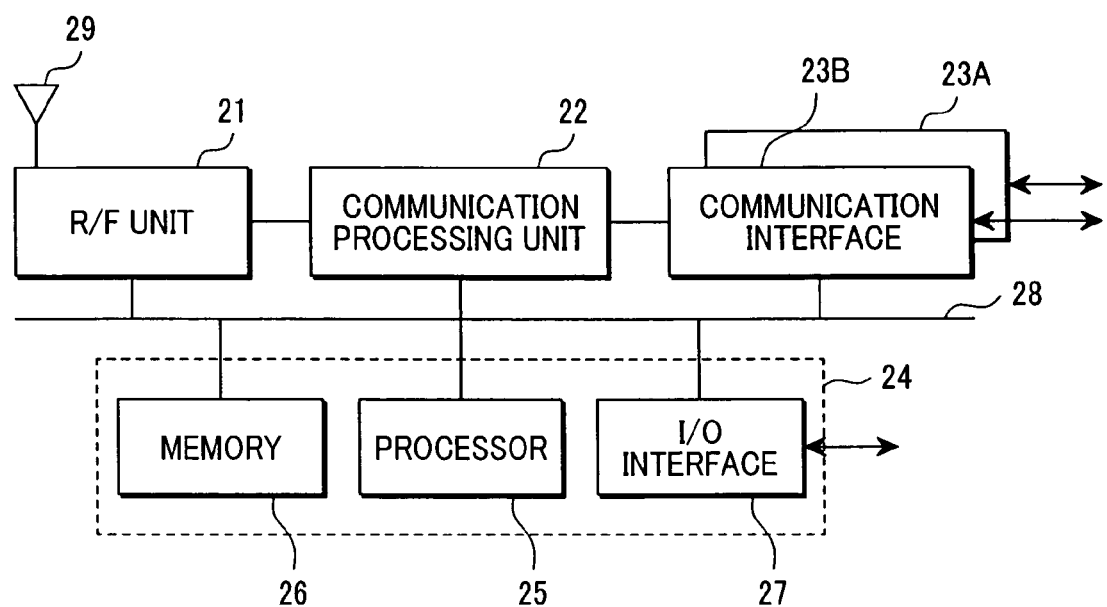
FIG. 3 is a block diagram showing a configuration of a 1xEV-DO base station 20-1.

FIG. 3 is a block diagram showing a configuration of the 1xEV-DO base station 20-1.

The 1xEV-DO base station 20-1 comprises: an RF unit 21 provided with an antenna 29; a communication processing unit 22; communication interfaces 23A and 23B for communicating with the 1xEV-DO base station controller 60 and the monitoring node 50; a control unit 24; and an internal bus 28 for connecting these elements.

The communication processing unit 22 includes a communication processing function such as protocol processing for received signals inputted from the RF unit 21, and failure monitoring, and a function to forward communication frames. A received frame from the RF unit 21 is forwarded to the communication interface 23A for 1xEV-DO base station controller 60 after converted into a specific packet format by the communication processing unit 22. A packet destined for a wireless terminal transmitted from the 1xEV-DO base station controller 60 is received by the communication interface 23A and forwarded to the RF unit 21 via the communication processing unit 22.

A control packet transmitted from the monitoring node 50 to the 1xEV-DO base station 20-1 is received by the communication interface 23B, and forwarded to the control unit 24 via the communication processing unit 22. A packet destined for the monitoring node 50 and outputted from the control unit 24 is forwarded to the communication interface 23B via the communication processing unit 22.

The control unit 24 includes a processor (CPU) 25 for controlling the operation of the whole 1xEV-DO base station 20-1, a memory 26 for storing various programs to be executed by the processor 25 and data, and an input/output (I/O) interface 27 through which signals are communicated with external devices. As described later, when a request to transmit communication quality in a wireless section was received from the monitoring node 50, the control unit 24 measures quality of communication with each wireless terminal connected to the 1xEV-DO base station 20-1, and notifies the monitoring node 50 of the measured communication quality.

The Wi-Fi base station 30-1 and the WiMAX base station 40-1 also basically have the same block configuration as the 1xEV-DO base station 20-1, and each provided with the RF unit 21, the communication processing unit 22, and a control program that adapt to each wireless communication method.

In the wireless communication system of the present invention, each control unit of the Wi-Fi base station 30-1 and the WiMAX base station 40-1, corresponding to the unit 24 of FIG. 3, has a function of creating a control packet indicating ID information of the wireless terminal 10 in a process of establishing a session of the wireless terminal 10, and transmitting it to the monitoring node 50 via a communication processing unit corresponding to the unit 22 of FIG. 3 and a monitoring node communication interface corresponding to the interface 23B of FIG. 3. As the ID information of the wireless terminal, the control unit of the Wi-Fi base station 30-1 notifies the monitoring node 50 of the MAC address of the wireless terminal 10 and an IP address for IPsec. As the ID information of the wireless terminal, the control unit of the WiMAX base station 40-1 notifies the monitoring node 50 of the MAC address and HoA of the wireless terminal 10, and the 1xEV-DO base station 20-1 notifies the monitoring node 50 of UATI of the wireless terminal 10.

Figure 4:
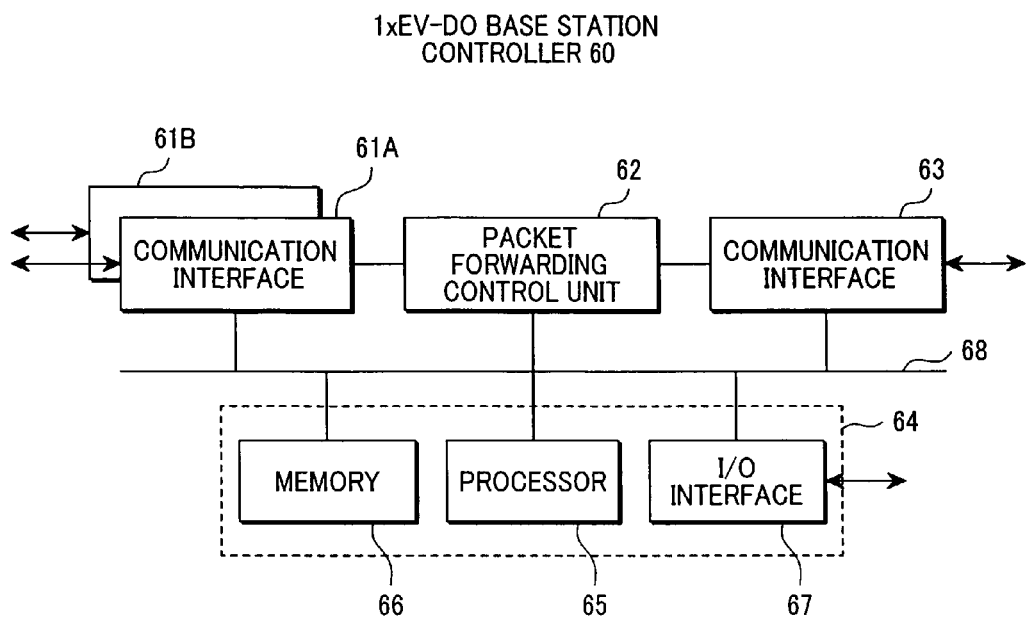
FIG. 4 is a block diagram showing a configuration of a 1xEV-DO base station controller (BSC) 60.

FIG. 4 is a block diagram showing a configuration of a 1xEV-DO base station controller (BSC) 60.

The 1xEV-DO base station controller 60 comprises: a communication interface 61A for communicating with the 1xEV-DO base station 20-1; a communication interface 61B for communicating with the monitoring node 50; a communication interface 63 for communicating with the home agent 90; a packet forward control unit 62 connected between these communication interfaces; a control unit 64; and an internal bus 68 for connecting these elements.

In FIG. 4, only one communication interface for the 1xEV-DO base station 20-1 is shown. However, the 1xEV-DO base station controller 60 is provided with a plurality of communication interfaces 61A determined depending on the number of 1xEV-DO base stations to be accommodated to the controller 60.

The control unit 64 includes: a processor (CPU) 65 for controlling the operation of the whole 1xEV-DO base station controller; memory 66 for storing various programs to be executed by processor 65 and data; and an input/output (I/O) interface 67 for communicating signals with external devices. The memory 66 stores various programs for performing a 1xEV-DO session control function, a mobility management function, a PCF (Packet Control Function) function of 3GPP2 (3rd Generation Partnership Project 2), a PDSN (Packet data Serving Node) function, and other functions.

The packet forwarding control unit 62 controls the forwarding of packets received through the communication interfaces 61A, 61B, and 63. User packets are forwarded to one of the other communication interfaces specified by destination information of the packet. 1xEV-DO session control packets received by the communication interfaces 61A and 63, and control packets from the monitoring node 50 received through the communication interface 61B are forwarded to the control unit 64.

The processor 65 of the control unit 64 processes each received packet according to 1xEV-DO session control procedure, and creates a new control packet. 1xEV-DO session control packets created by the control unit 64 are transmitted from the communication interface 61A or 63 by the packet forwarding control unit 62.

In the 1xEV-DO base station controller 60 of the present invention, as described later, the control unit 64 creates a control packet, which is addressed to the monitoring node 50 and indicates UATI and HoA of the wireless terminal, in the process of establishing a 1xEV-DO session for the wireless terminal 10. The control packet is created, for example, as a connection establishment notification packet of the wireless terminal, and transmitted from the communication interface 61B by the packet forwarding control unit 62.

The Wi-Fi base station controller 70 and the WiMAX base station controller 80 basically have the same block configuration as the 1xEV-DO base station controller 60.

For example, the packet forwarding control unit of the Wi-Fi base station controller 70, which corresponds to the unit 62 of FIG. 4, has a function of packet data serving node (RDIF: Packet Data Interworking Function of 3GPP2), and various programs for performing a Wi-Fi session control function and other functions are stored in a memory of a control unit which corresponds to the unit 64 of FIG. 4. The control unit of the Wi-Fi base station controller 70 creates a control packet, which is addressed to the monitoring node 50 and indicates the IP address and HoA for IPsec of the wireless terminal, in the process of establishing a Wi-Fi session for the wireless terminal 10. This control packet is created, for example, as a connection establishment notification packet of the wireless terminal, and transmitted from the communication interface for the monitoring node by the packet forwarding control unit.

A control unit of the WiMAX base station controller 80, which corresponds to the controller 64 of FIG. 4, has a memory in which various programs for performing a WiMAX session control function, a mobility management function, and other functions are stored. The control unit of the WiMAX base station controller 80 creates a connection establishment notification packet of the wireless terminal 10 when a WiMAX session for the wireless terminal is established. This packet is transmitted from the communication interface for the monitoring node by the packet forwarding control unit.

Figure 5:
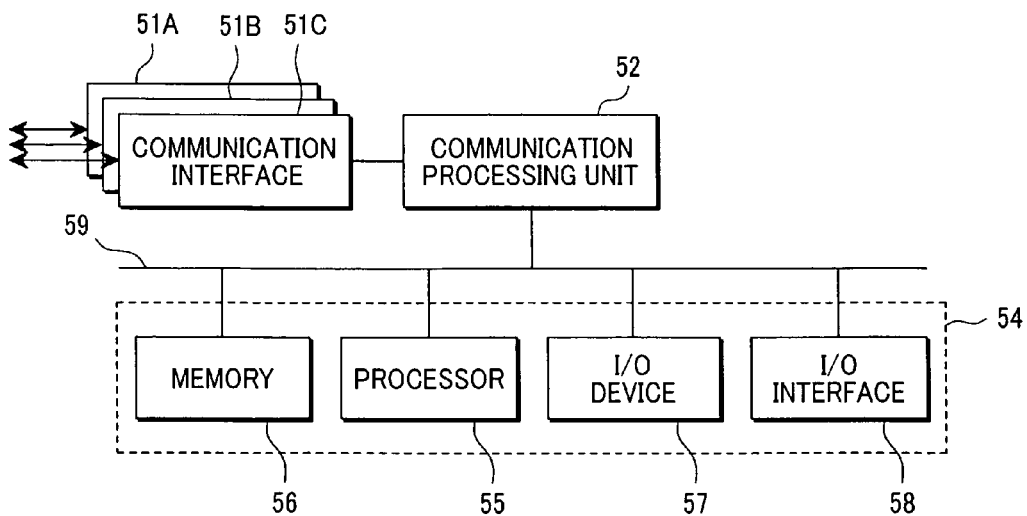
FIG. 5 is a block diagram showing a configuration of a monitoring node 50.

FIG. 5 is a block diagram showing a configuration of the monitoring node 50.

The monitoring node 50 comprises: a communication interface 51A for communicating with the base stations (1xEV-DO base station 20-1, Wi-Fi base station 30-1, and WiMAX base station 40-1); a communication interface 51B for communicating with the base station controllers (1xEV-DO base station controller 60, Wi-Fi base station controller 70, and WiMAX base station controller 80); a communication interface 51C for communicating with the home agent 90; a communication controller 52 connected to these communication interfaces; a control unit 54; and an internal bus 59 for connecting these elements.

The communication controller 52 reads out received packets from the communication interfaces 51A to 51C to deliver them to the control unit 54, and sends out transmission packets created by the control unit 52 to one of the communication interfaces corresponding to their destinations. The control unit 54 includes: a processor (CPU) 55 for controlling the operation of the whole monitoring node; memory 56 for storing various programs to be executed by the processor 55 and data; and input-output devices 57 such as keyboard and display. As required, an input/output (I/O) interface 58 for communicating signals with an external device is provided. In the memory 56, a terminal information table 500 and a system configuration information table 600 are formed as will be described later. The memory 56 further stores, as programs related to the present invention, a terminal information updating routine 800, a communication quality information collection processing routine 820, and an optimum path selection processing routine 850.

Figure 6:
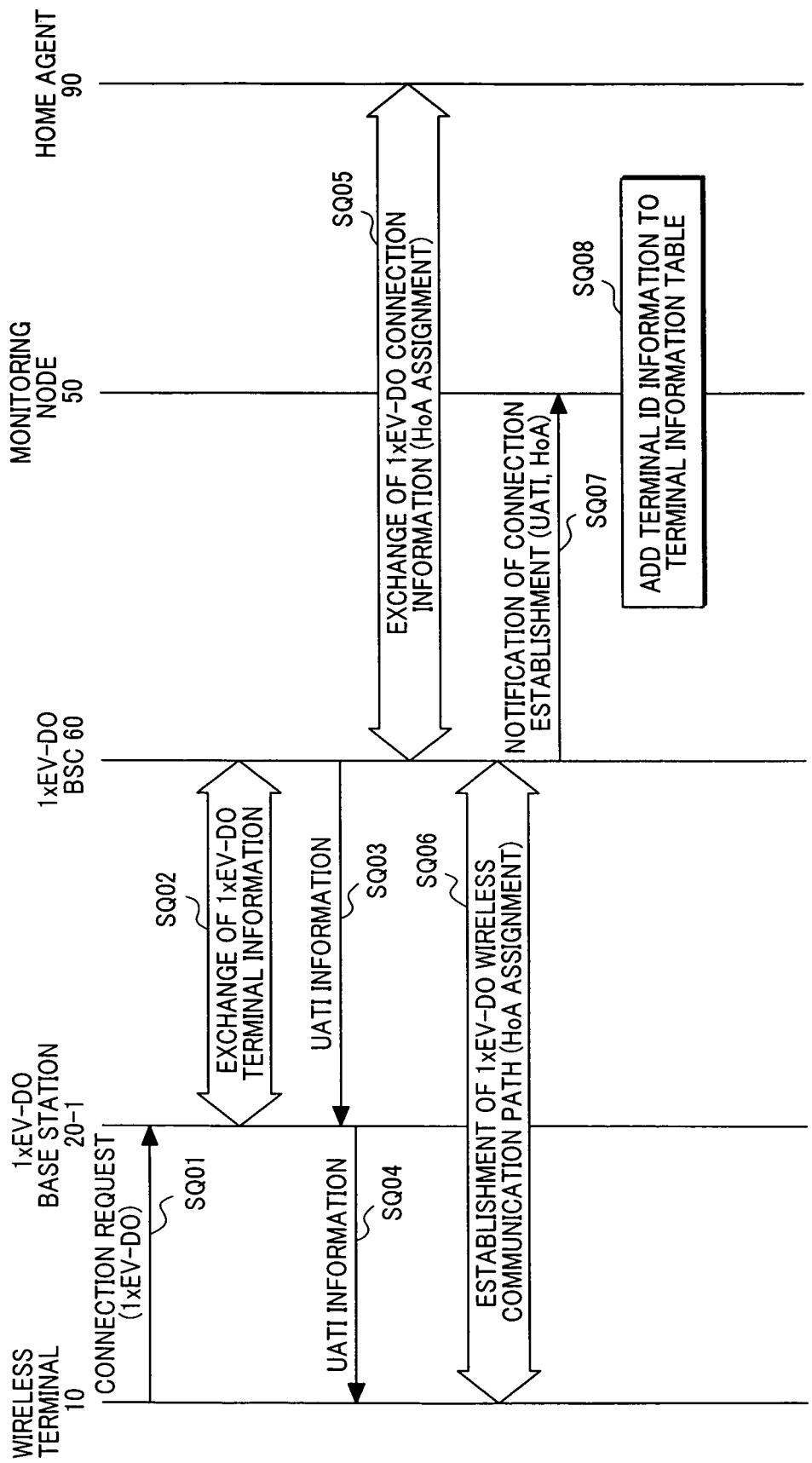
FIG. 6 is a drawing showing a communication sequence for establishing a wireless communication path for 1xEV-DO by a wireless terminal 10 in the wireless communication network of FIG. 1.
Figure 7:
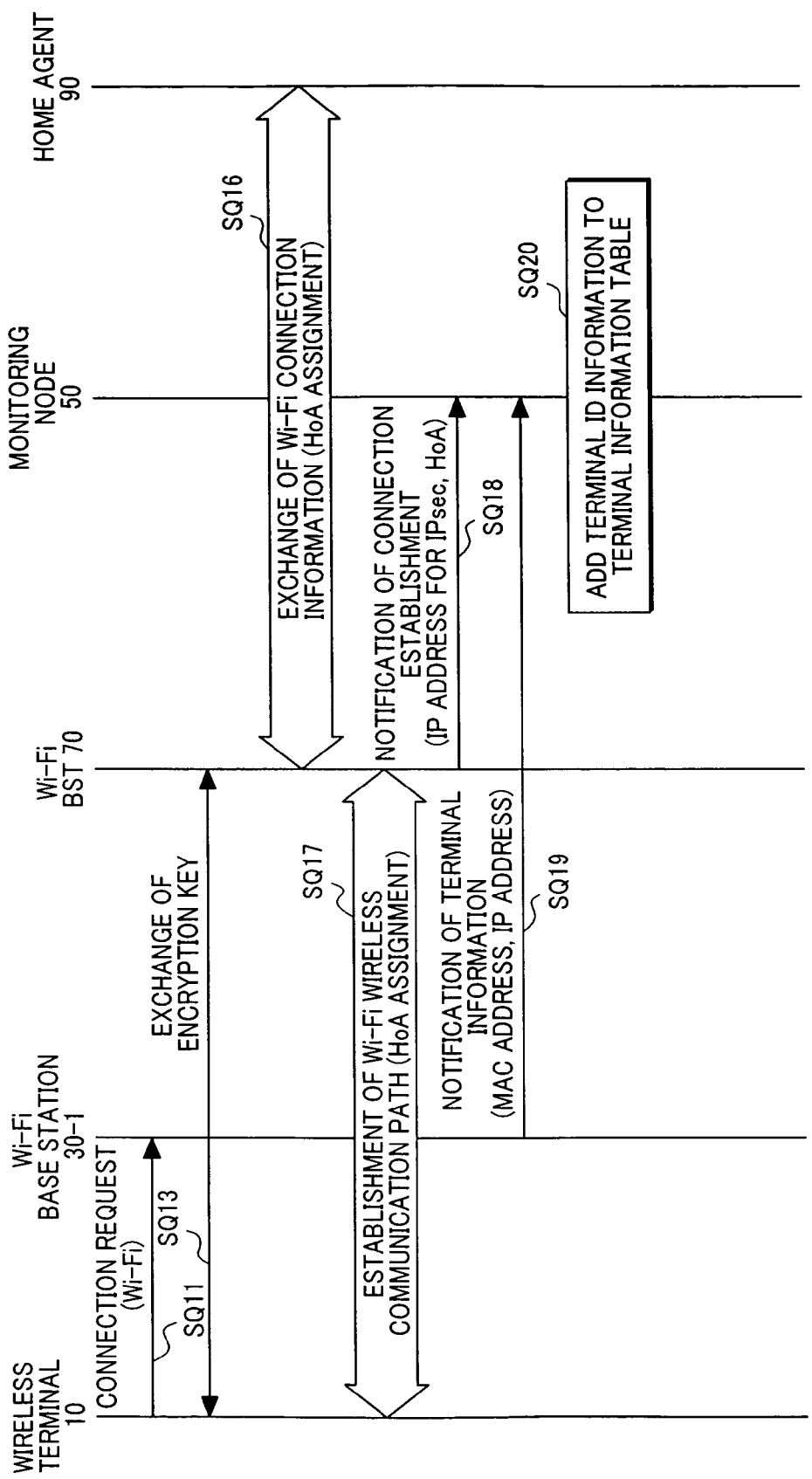
FIG. 7 is a drawing showing a communication sequence for establishing a wireless communication path for Wi-Fi by the wireless terminal 10 in the wireless communication network of FIG. 1.
Figure 8:
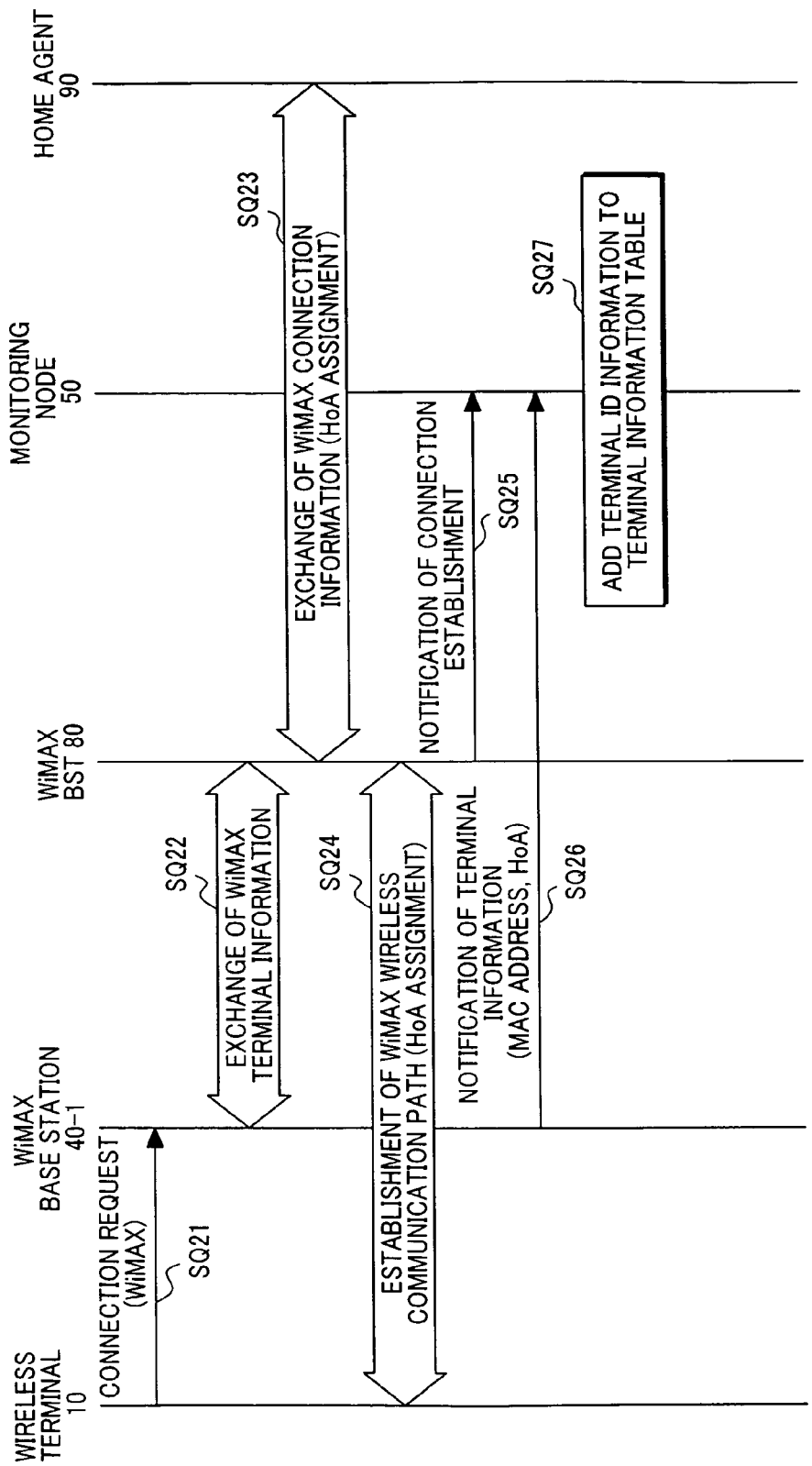
FIG. 8 is a drawing showing a communication sequence for establishing a wireless communication path for WiMAX by the wireless terminal 10 in the wireless communication network of FIG. 1.

With reference to FIGS. 6 to 8, description will be made about the sequence of connecting the wireless terminal 10 with the 1xEV-DO base station 20-1, the Wi-Fi base station 30-1, and the WiMAX base station 40-1 in the wireless communication system of the present invention.

When power is turned on, the wireless terminal 10 successively activates the RF modules 11A to 11C to establish wireless communication paths with a plurality of base stations different in the wireless communication methods. Following description assumes that the 1xEV-DO module 11A is first activated, then the Wi-Fi module 11B is activated, finally the WiMAX module 11C is activated.

Upon detecting a radio wave transmitted from the 1xEV-DO base station 20-1 by the 1xEV-DO module 11A, the wireless terminal 10 transmits, as shown in FIG. 6, a connection request to the 1xEV-DO base station 20-1 (SQ01). In this embodiment, the connection request transmitted from the wireless terminal 10 includes a terminal ID called NAI (Network Access Identifier). NAI is ID information peculiar to each terminal and belongs to upper layer ID information that is not used by the base stations 20-1, 30-1 and 40-1, but used by the home agent 90.

Upon receiving the connection request from the wireless terminal 10, the 1xEV-DO base station 20-1 exchanges 1xEV-DO terminal information with the 1xEV-DO base station controller 60 to judge whether the connection with wireless terminal 10 is permissible or not (SQ02). The 1xEV-DO terminal information includes NAI of the wireless terminal 10.

When the connection with the wireless terminal 10 is judged permissible, the 1xEV-DO base station controller 60 assigns to the wireless terminal 10 a UATI (Unicast Access Terminal Identifier) which is unique for each session, and notifies the 1xEV-DO base station 20-1 of the UATI (SQ03), so that UATI is informed from the 1xEV-DO base station 20-1 to the wireless terminal 10 (SQ04). The 1xEV-DO base station controller 60 negotiates with the home agent 90 by designating the wireless terminal 10 by NAI to obtain HoA to be used by the wireless terminal 10 (SQ05).

The home agent 90 having assigned HoA to the wireless terminal 10 stores the correspondence among HoA, NAI of the wireless terminal, ID of the wireless communication method 1xEV-DO or ID of 1xEV-DO base station controller 60 (or 1xEV-DO base station 20-1) in a management table.

When HoA of the wireless terminal 10 is determined, the 1xEV-DO base station controller 60 notifies the wireless terminal 10 of the HoA via the 1xEV-DO base station 20-1, and establishes a 1xEV-DO wireless communication path for the wireless terminal 10 (SQ06). Upon establishing the wireless communication path, the 1xEV-DO base station controller 60 transmits to the monitoring node 50 a notification packet indicating that 1xEV-DO connection for the wireless terminal 10 has been established (SQ07). In this embodiment, UATI and HoA of the wireless terminal 10 is notified to the monitoring node 50 by the 1xEV-DO connection establishment notification packet. However, the UATI and HoA may be notified to the monitoring node 50 by another packet other than the connection establishment notification packet.

Upon receiving the UATI information and HoA information of the wireless terminal 10, the monitoring node 50 updates the terminal information table 500 shown in FIG. 9 (SQ08). The updating of the terminal information table 500 performed by the monitoring node 50 will be detailed later with reference to FIG. 11.

When 1xEV-DO connection has been established, the wireless terminal 10 activates the Wi-Fi module 11B to detect a radio wave transmitted from the Wi-Fi base station 30-1. Upon detecting the radio wave transmitted from the Wi-Fi base station 30-1, the wireless terminal 10 transmits, as shown in the FIG. 7, a connection request including NAI to the Wi-Fi base station 30-1 (SQ11). Hereinafter, it will be described in the case where the wireless terminal 10 performs Wi-Fi communication by using IPSec. However, IPSec is not mandatory for Wi-Fi communication. Although this embodiment assumes that an IP address for IPSec is assigned by DHCP (Dynamic Host Configuration Protocol), the IP address may be previously assigned by a pre-assign method.

The Wi-Fi base station controller 70 exchanges encryption key with the wireless terminal 10 (SQ13) according to a encryption key exchange protocol such as, for example, IKEv2 (Internet Key Exchange version 2), and establishes a secure wireless communication path with the wireless terminal 10. After that, the Wi-Fi base station controller 70 negotiates with the home agent 90 by designating the wireless terminal 10 with NAI to obtain HoA to be used by the wireless terminal 10 (SQ16). When it was found on the management table that HoA has already been assigned to the wireless terminal 10 identified by NAI during 1xEV-DO connection information exchange, the home agent 90 notifies the Wi-Fi base station controller 70 of the same HoA as the previous one, and stores the ID of the wireless method Wi-Fi or the ID of the Wi-Fi base station controller 70 (or the Wi-Fi base station 30-1) in the management table, in association with the HoA and NAI.

Upon obtaining the HoA of the wireless terminal 10, the Wi-Fi base station controller 70 notifies the wireless terminal 10 of the HoA via the Wi-Fi base station 30-1, and establishes a Wi-Fi wireless communication path for the wireless terminal 10 (SQ17). When the Wi-Fi wireless communication path for the wireless terminal 10 has been established, a notification packet indicating the establishment of Wi-Fi connection for the wireless terminal 10 is transmitted from the Wi-Fi base station controller 70 to the monitoring node 50 (SQ18), and a terminal information notification packet indicating the MAC address of the wireless terminal 10 and the IP address for IPsec is transmitted from the Wi-Fi base station 30-1 to the monitoring node 50 (SQ19). In this embodiment, HoA of the wireless terminal 10 and the IP address for IPsec are notified to the monitoring node 50 by the Wi-Fi connection establishment notification packet.

The monitoring node 50 updates the terminal information table 500 shown in FIG. 9, based on the HoA of the wireless terminal 10 and the IP address for IPsec having been received from the Wi-Fi base station controller 70 and the MAC address of the wireless terminal 10 and the IP address for IPsec having been received from the Wi-Fi base station 30-1 (SQ08). The updating of the terminal information table 500 will be detailed later with reference to FIG. 11.

When the Wi-Fi connection has been established, the wireless terminal 10 activates the WiMAX module 11C to detect a radio wave transmitted from the WiMAX base station 40-1. Upon detecting the radio wave transmitted from the WiMAX base station 40-1, the wireless terminal 10 transmits a connection request including NAI to the base station 40-1 (SQ21) as shown in FIG. 8. Upon receiving the connection request from the wireless terminal 10, the WiMAX base station 40-1 exchanges WiMAX terminal information with the WiMAX base station controller 80 (SQ22), and determines whether the connection with wireless terminal 10 is permissible. The WiMAX terminal information includes NAI of the wireless terminal 10.

When the connection with the wireless terminal 10 was judged permissible, the WiMAX base station controller 80 negotiates with the home agent 90 to obtain HoA to be used by the wireless terminal 10 (SQ23). When it was found on the management table that HoA has already been assigned to the wireless terminal 10 identified by NAI during connection information exchange of 1xEV-DO or Wi-Fi, the home agent 90 notifies the WiMAX base station controller 80 of the same HoA as the previous one, and stores the ID of the wireless communication method WiMAX or the ID of the WiMAX base station controller 80 (or the WiMAX base station 40-1) in the management table, in association with the HoA and NAI.

Upon obtaining HoA of the wireless terminal 10, the WiMAX base station controller 80 notifies the wireless terminal 10 of the HoA via the WiMAX base station 40-1, and establishes a WiMAX wireless communication path for the wireless terminal 10 (SQ24). When the WiMAX wireless communication path for the wireless terminal 10 was established, a notification packet indicating the establishment of the WiMAX connection for the wireless terminal 10 is transmitted from the WiMAX base station controller 80 to the monitoring node 50 (SQ25), and a terminal information notification packet indicating the MAC address and HoA of the wireless terminal 10 is transmitted from the WiMAX base station 40-1 to the monitoring node 50 (SQ26).

The notification packet of WiMAX connection establishment specifies the wireless terminal 10 by HoA. The MAC address of the wireless terminal 10 may be notified to the monitoring node 50 by the notification packet of the Wi-Fi connection establishment transmitted from the WiMAX base station controller 80. In this case, step SQ26 may be omitted.

The monitoring node 50 updates the terminal information table 500 shown in FIG. 9, based on the MAC address and HoA of the wireless terminal 10 received from the WiMAX base station 40-1 or the WiMAX base station controller 80 (SQ27). The updating of the terminal information table 500 will be detailed later with reference to FIG. 11.

Upon receiving connection establishment notification from the base station controller (1xEV-DO base station controller 60, Wi-Fi base station controller 70, or WiMAX base station controller 80), the monitoring node 50 refers to the terminal information table 500 to determine whether HoA indicated by the received connection establishment notification has already been registered in the terminal information table 500. When the HoA is not registered yet, the monitoring node 50 creates a new table entry having HoA indicated by the connection establishment notification and adds the table entry to the terminal information table 500.

FIG. 9 shows an embodiment of table entry that constitute the terminal information table 500 provided in the monitoring node 50.

Each table entry of the terminal information table 500 comprises: storage area 501 of HoA assigned to a wireless terminal by the home agent 90; storage area 502 of terminal ID information; storage area 503 of base station information; and storage area 504 of optimum wireless path information.

The storage area 502 of terminal ID information indicates: UATI 502A to be used in 1xEV-DO; IP address for IPsec 502B to be used in Wi-Fi; MAC address 502C of a wireless terminal to be used in Wi-Fi; and MAC address 502D of the wireless terminal to be used in WiMAX. The MAC address 502C of the wireless terminal to be used in Wi-Fi usually has the same value as the MAC address 502D to be used in WiMAX. In this embodiment, however, storage areas are individually prepared so as to enable the monitoring node 50 to manage MAC addresses even if different addresses are used in Wi-Fi and WiMAX.

The base station information storage area 503 is used to store communication quality information in the wireless section for each wireless communication method. In this embodiment, the base station information storage area 503 comprises a plurality of records 503A-503C corresponding to the wireless communication methods, and each record indicates communication quality information and ID of source base station. As the communication quality information, for example, the value of RSSI (Receive Signal Strength Indicator) indicating receive power strength from the wireless terminal detected in each base station is stored.

The storage area 504 of optimum wireless path information stores information indicating an optimum wireless path selected by the monitoring node 50 based on communication quality information indicated by the base station information storage area 503, for example, the ID of a base station that can provide the optimum wireless path. In place of the base station ID, the ID of a wireless communication method may be stored.

The monitoring node 50 may select the optimum wireless path in consideration of information other than the communication quality information in the wireless section, such as throughput in each base station and the number of wireless terminals being connected. Selection of the optimum wireless path is carried out when a new table entry is registered in the wireless terminal information table, or during the collection of communication quality information performed periodically.

The terminal information table 500 shown here stores terminal ID information 502 (502A-502D) different dependent on wireless communication methods, in association with HoA 501 of the wireless terminal 10. Therefore, the monitoring node 50 can store communication quality information of different wireless communication methods into one table entry even when communication quality information of the wireless terminal is received from a plurality of base stations having different wireless communication methods in such a manner that the same wireless terminal is designated by different IDs such as UATI and MAC address. The monitoring node 50 can notify the home agent 90 of the optimum wireless path for each wireless terminal by designating the wireless terminal with HoA.

FIG. 10 shows an example of a system configuration information table 600 provided in the monitoring node 50.

The system configuration information table 600 comprises a plurality of table entries for indicating the IDs 602 of base stations connected to the monitoring node 50 for each wireless communication method 601. Each table entry indicates throughput 603 and the number of wireless terminals 602 being connected to base station having the base station ID 602.

The monitoring node 50 can request each base station under its control to transmit communication quality information of a wireless terminal, by using the base station ID 602 registered in the system configuration information table 600, and store communication quality information collected from the base station in the terminal information table 500. Further, by collecting current throughput and the number of terminals from each base station and storing them in the system configuration information table 600, the monitoring node 50 can determine the optimum wireless path for each wireless terminal based on the communication quality information 503 indicated in the terminal information table 500 and the throughput 603 and the number of terminals 604 of each base station indicated in the system configuration information table 600.

Figure 11:
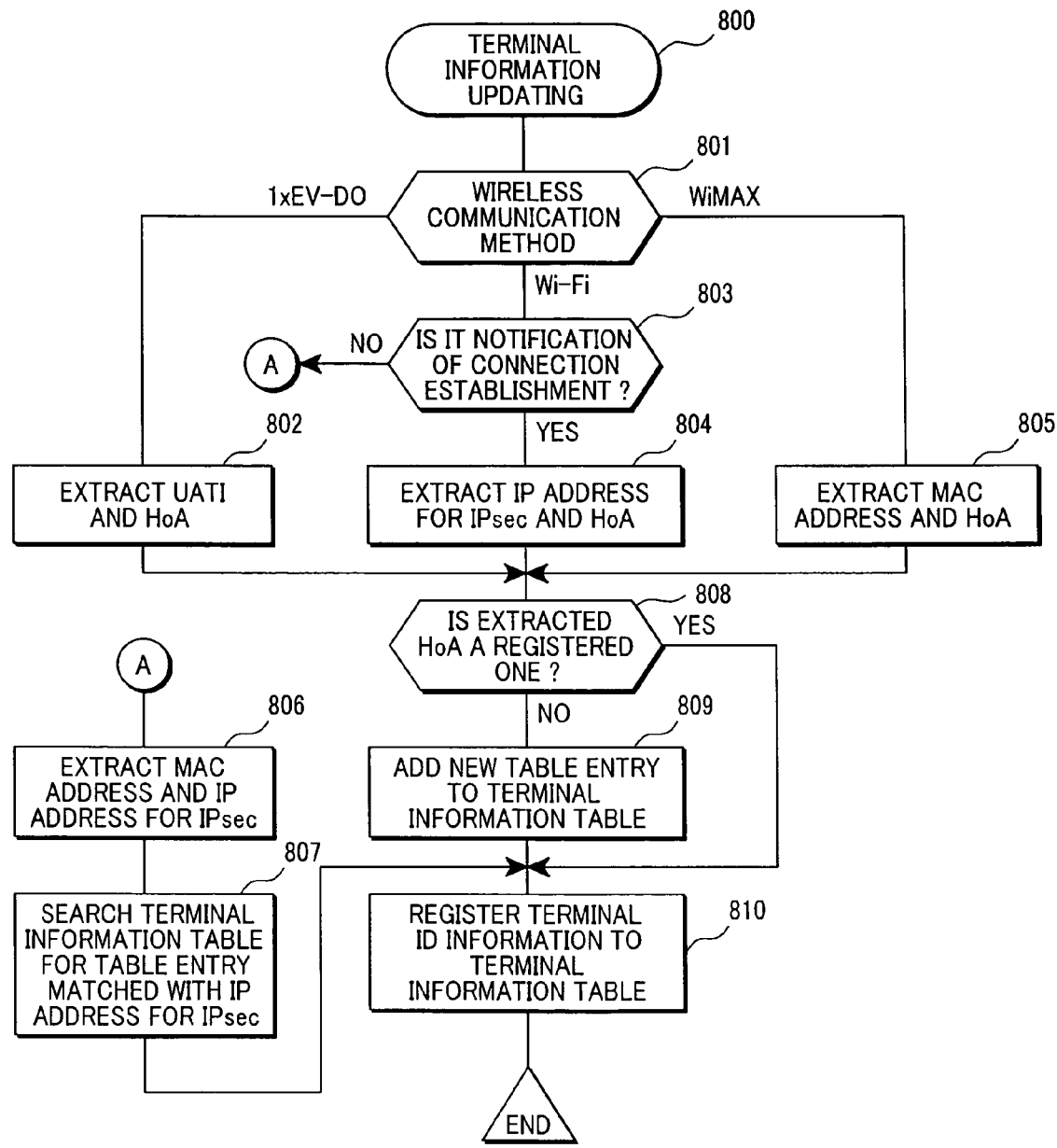
FIG. 11 is a flowchart showing an embodiment of a terminal information updating routine 800 to be executed in a monitoring node 50.

FIG. 11 is a flowchart showing an embodiment of the terminal information updating routine 800 to be executed in the monitoring node 50.

Upon receiving the connection establishment notification packets (SQ07, SQ18, SQ25) from the base station controllers 60 to 80 described in FIGS. 6 to 8, or the terminal information notification packets (SQ19, SQ26) from the base stations 30-1 and 40-1, the control unit 54 (processor 55) of the monitoring node 50 executes the terminal information updating routine 800 to update the terminal information table 800.

In the terminal information updating routine 800, the type of a wireless communication method is determined from the received packet (Step 801). The type of a wireless communication method can be determined, for example, by collating the ID of a base station being the source of the received packet with the system configuration information table 600. Alternatively, the source station may transmit a notification packet including the ID information of a wireless communication method to the monitoring node 50 so that the processor 55 can determine the type of a wireless communication method from the ID information.

When the received packet is a 1xEV-DO connection establishment notification packet, the processor 55 extracts UATI and HoA from the received packet (802), and determines whether the HoA has already been registered in the terminal information table 500 (808). If HoA is not registered yet, the processor 55 adds a new table entry having the received HoA to the terminal information table 500 (809), and registers terminal ID information in the terminal information table (810). In the case of 1xEV-DO, the value of UATI extracted from the received packet is registered in the table entry as UATI 502A. When a table entry having the same HoA 501 as the received HoA has already been registered in the terminal information table 500, the processor 55 registers, in Step 810, the value of UATI extracted from the received packet in the existing table entry as UATI 502A.

When the received packet is a packet for Wi-Fi, the processor 55 determines whether the received packet is a connection establishment notification packet (803). If the received packet is a connection establishment notification packet, the processor 55 extracts the IP address for IPsec and HQA of a wireless terminal from the received packet (804), and determines whether the HoA has already been registered in the terminal information table 500 (808).

When HoA is not registered, the processor 55 adds a new table entry having the received HoA to the terminal information table 500 (809), and registers, in Step 810, an IP address for IPsec extracted from the received packet in the table entry as an IP address 502B. If a table entry having the same HoA 501 as the received HoA has already been registered in the terminal information table 500, the processor 55 registers, in Step 810, the IP address for IPsec extracted from the received packet in the existing table entry.

When the received packet is a terminal information notification packet transmitted from the Wi-Fi base station, the processor extracts the MAC address and the IP address for IPsec of a wireless terminal from the received packet (806), retrieves a table entry having the IP address for IPsec from the terminal information table 500 (807), and registers, in Step 810, the value of the MAC address extracted from the received packet in the table entry as an address 502C for Wi-Fi.

When the received packet is a packet for WiMAX, the processor 55 extracts the MAC address and HoA of a wireless terminal from the received packet (805), and determines whether the HoA has already been registered in the terminal information table 500 (808). If HoA is not registered yet, the processor 55 adds a new table entry having the received HoA to the terminal information table 500 (809), and registers, in Step 810, the value of MAC address extracted from the received packet in the table entry as a MAC address 502D for WiMAX. If a table entry having the same HoA 501 as the received HoA has already been registered in the terminal information table 500, the processor 55 registers, in Step 810, the value of MAC address extracted from the received packet in the existing table entry as a MAC address 502D for WiMAX.

Figure 12:
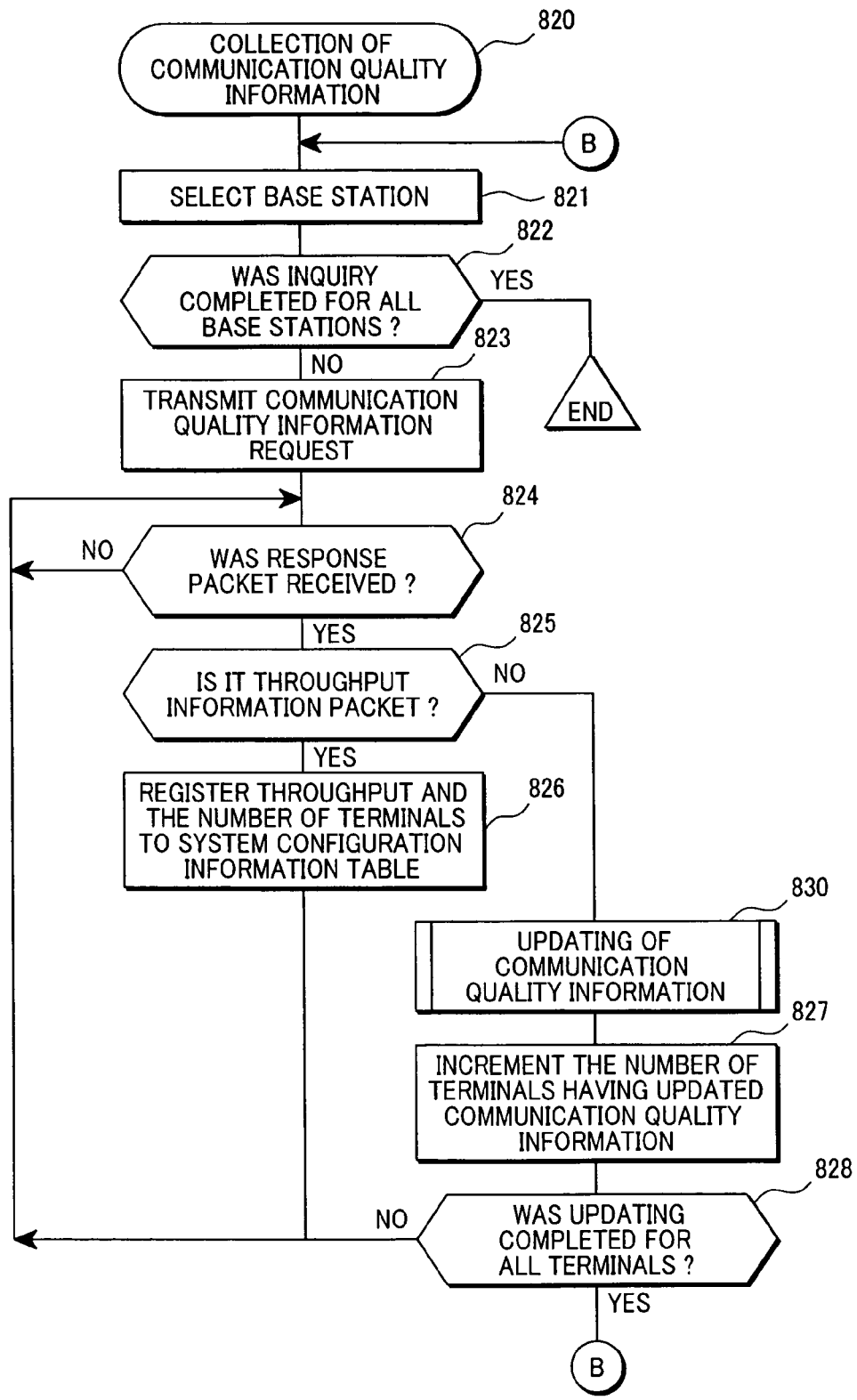
FIG. 12 is a flowchart showing an embodiment of a communication quality information collection processing routine 820 to be executed in the monitoring node 50.

FIG. 12 is a flowchart showing an embodiment of the communication quality information collection processing routine 820 to be executed in the monitoring node 50. The communication quality information collection processing routine 820 is periodically executed by the processor 55 of the monitoring node 50.

In the communication quality information collection processing routine 820, the processor 55 successively selects base stations (base station ID) from the system configuration information table 600 (821), and transmits a communication quality information request packet to the selected base station (823). When inquiries about the communication quality information are completed for all base stations (822), the processor 55 terminates this routine 820.

After the transmission of the communication quality information request packet, the processor 55 waits for a response packet to the request packet from the base stations (824). Upon receiving a response packet, the processor 55 determines whether the received packet is a throughput information packet (825). If the received packet is a throughput information packet, the processor 55 registers throughput and the number of terminals N indicated in the received packet in the system configuration information table 600 (826), and waits for a next packet from a base station in Step 824.

When the received packet from the base station is a communication quality information packet, the processor 55 performs communication quality information updating 830 for the terminal information table 500. After that, the processor 55 increments the number of terminals n having been updated communication quality information (827). By comparing the number of terminals n with N, the processor 55 determines whether communication quality information for all terminals connected to the base stations has been updated (828). If the updating of communication quality information of all terminals connected to the base stations is not complete, the processor 55 waits for a next packet from the base stations in Step 824. When the updating of communication quality information of all terminals is complete, the program sequence proceeds to Step 821 to repeat the above-described processing by selecting a next base station from the system configuration information table 600. However, if each base station can transmit a notification packet indicating the completion of communication quality information transmission, the processor 55 may proceed to Step 821 upon receiving the notification packet.

Figure 13:
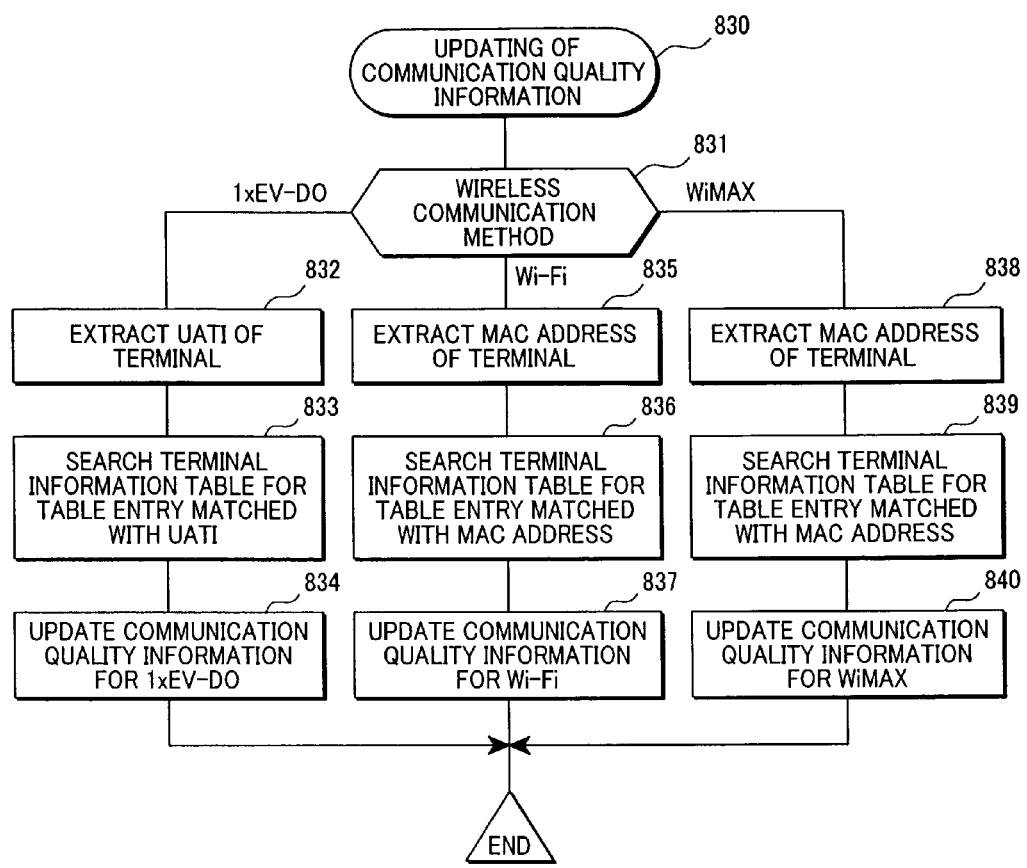
FIG. 13 is a detailed flowchart of communication quality information updating 830.

FIG. 13 shows a detailed flowchart of the communication quality information updating 830.

In the communication quality information updating 830, the processor 55 determines the type of the wireless communication method from the ID of the source base station of the received communication quality information packet (831). When the received packet is a communication quality information packet for 1xEV-DO, the processor 55 extracts UATI of the wireless terminal from the received packet (832), retrieves a table entry having UATI 502A matched with the extracted UATI from the terminal information table 500 (833), and stores the communication quality information and a base station ID for 1xEV-DO in the table entry (834).

When the received packet is a communication quality information packet for Wi-Fi, the processor 55 extracts the MAC address of the wireless terminal from the received packet (835), retrieves a table entry having a MAC address 502C matched with the extracted MAC address from the terminal information table 500 (836), and stores the communication quality information and a base station ID for Wi-Fi in the table entry (837).

When the received packet is a communication quality information packet for WiMAX, the processor 55 extracts the MAC address of the wireless terminal from the received packet (838), retrieves a table entry having a MAC address 502D matched with the extracted MAC address from the terminal information table 500 (839), and stores the communication quality information and a base station ID for WiMAX in the table entry (840).

Figure 14:
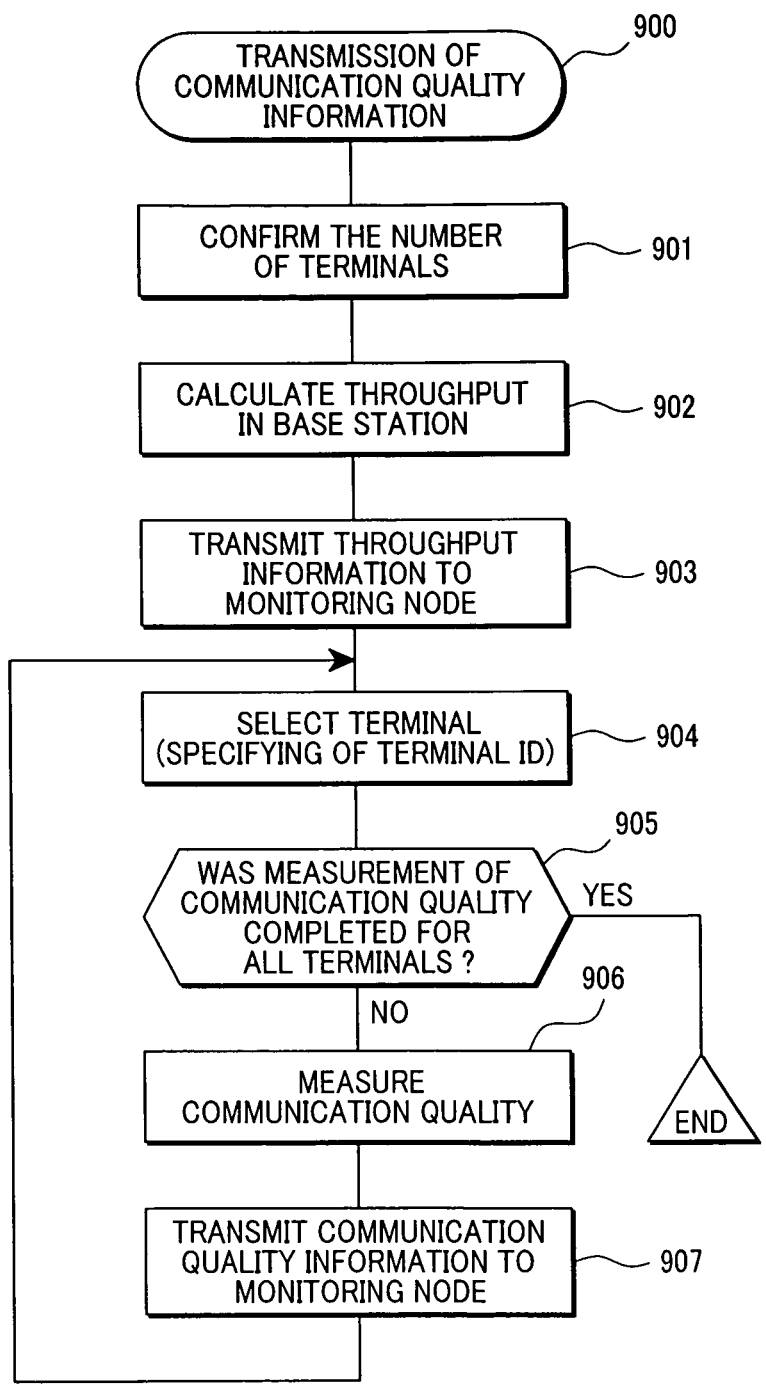
FIG. 14 is a flowchart showing an embodiment of a communication quality information transmission processing routine 900 to be executed in each base station.

FIG. 14 is a flowchart showing an embodiment of a communication quality information transmission processing routine 900 to be executed by the control unit 24 (processor 25) of each base station when a packet for communication quality information request was received from the monitoring node 50.

In the communication quality information transmission processing routine 900, the processor 25 confirms the number N of wireless terminal currently being connected (901), calculates throughput in the base station (902), and transmits to the monitoring node 50 a throughput information packet that indicates the throughput and the number N of terminals (903).

After that, the processor 25 successively selects a wireless terminal from among N connected wireless terminals (904), and determines whether measurement of communication quality is completed for all terminals (905). If measurement of communication quality is not completed, the processor 25 measures communication quality, for example, RSSI, in a wireless section of a selected wireless terminal (906). On completion of the measurement (information collection) of communication quality in the wireless section of the wireless terminal, the processor 25 transmits to the monitoring node 50 a communication quality information packet indicating the ID and the communication quality of the wireless terminal (907). After that, the processor 25 selects a next wireless terminal in Step 904 to repeat the above-described processing.

In the communication quality information packet transmitted to the monitoring node 50, as the ID of a wireless terminal, the 1xEV-DO base station 20-1 uses UATI, and the Wi-Fi base station 30-1 and the WiMAX base station 40-1 use a MAC address.

Figure 15:
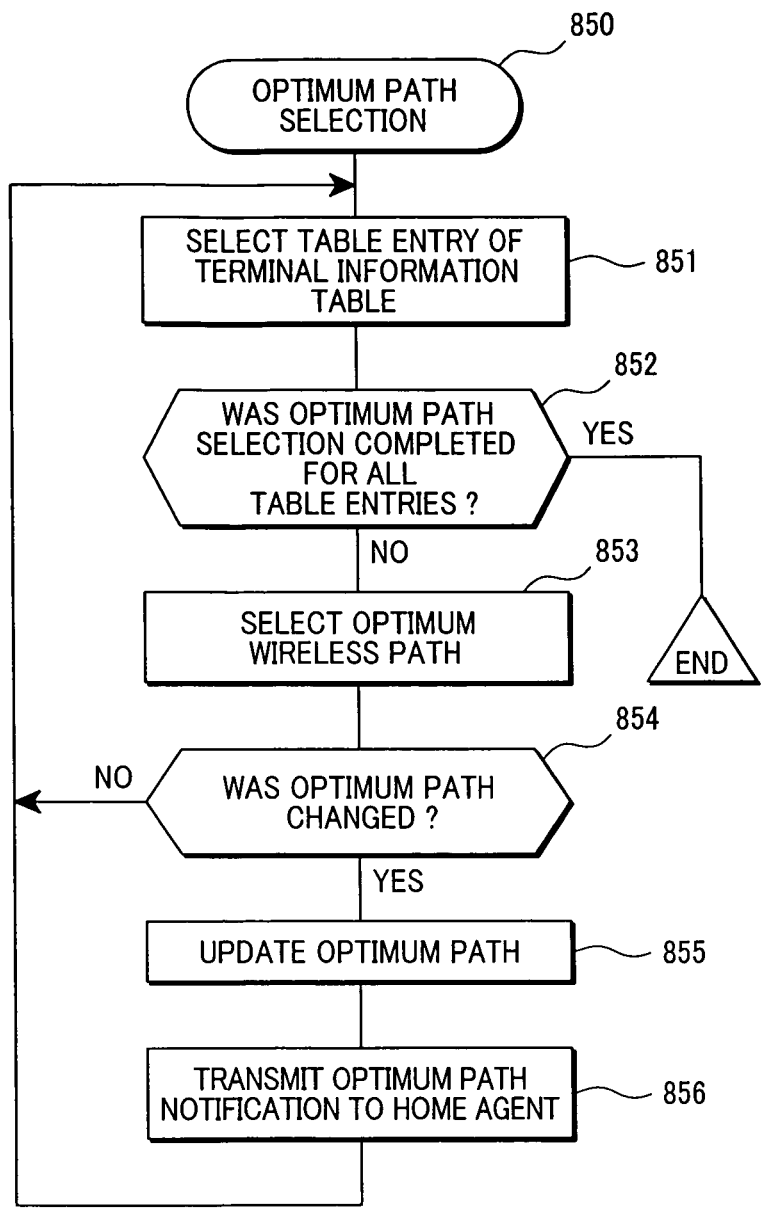
FIG. 15 is a flowchart showing an embodiment of an optimum path selection processing routine 850 to be executed in the monitoring node 50.

FIG. 15 is a flowchart showing an embodiment of an optimum path selection routine 850 to be periodically executed by the control unit 54 (processor 55) of the monitoring node 50.

In the optimum path selection routine 850, the processor 55 successively selects a table entry from the terminal information table 500 (Step 851), and selects a communication path in the wireless section that is optimum to a wireless terminal having HoA 502A, based on communication quality information indicated by the entry (853). When optimum path selection is completed for all entries registered in the terminal information table 500 (852), the processor 55 terminates this routine.

In Step 853, the processor 55 selects an optimum path (base station ID) by comparing communication quality information (the value of RSSI in the embodiment) indicated in the records 503A to 503C classified by wireless communication methods stored in the base station information storage area 503 of the table entry. However, the optimum path in the wireless section may be specified by referring to the system configuration information table 600 based on the base station ID indicated in the records 503A to 503C, and comprehensively evaluating the throughput 602 of each base station, the number of terminals 604, and communication quality information indicated in the records 503A to 503C.

Although above embodiment stores the value of RSSI in the terminal information table 500, other parameters such as DRC (Data Rate Control) information other than RSSI may be collected as communication quality information, so that the optimum path can be selected from among plural types of communication quality parameters.

In FIG. 15, the processor 55 compares the optimum path selected this time with the optimum wireless path 504 indicated in the terminal information table to determine whether the optimum route has changed (854). When the optimum path has changed, or when effective data is not registered yet as the optimum wireless paths 504, the processor 55 stores the optimum path (base station ID) selected this time as the optimum wireless path 504 in the terminal information table 500 (855), and transmits to the home agent 90 an optimum path notification packet that indicates HoA designating a wireless terminal and a base station ID indicating the optimum path (856). In place of the base station ID, type information of wireless communication method or the ID of the base station controller may be used.

If it is judged in Step 854 that the optimum path has not been changed, or after transmitting the optimum path notification packet in Step 856, the processor 55 returns to the first Step 851, and selects a next table entry from the terminal information table to repeat the above-described processing.

Upon receiving the optimum path notification packet from the monitoring node 50, the home agent 90 reflects the correspondence between the HoA and the base station ID (or the type informational of the wireless communication method) indicated by the received packet to the routing management table. When a packet destined for a wireless terminal is received from the core network NW, the home agent 90 can forward the received packet to a base station controller and a base station that can provide the optimum wireless communication path to the wireless terminal, by referring to the above-described routing management table. Further, by notifying from the home agent 90 to the wireless terminal of a wireless communication method with which the optimum wireless communication path is available, the wireless terminal can communicate with the other terminals by using an optimum RF module.

FIG. 16 shows another configuration example of the wireless communication network to which the present invention is applied.

In this embodiment, the home agent 90 accommodates a packet switch 91, and the base station controllers 60 to 80 shown in FIG. 1 are connected to the home agent 90 via the packet switch 91. The packet switch 91 is connected with the monitoring node 50 so as to receive optimum path notification packets from the monitoring node.

According to this network configuration, by managing the correspondence between HoA of each wireless terminal and the optimum wireless communication path in the packet switch 91 located between the home agent 90 and the base station controllers 60 to 80, the packet switch 91 can forward each received packet to a base station through a base station controller that can provide a wireless communication path optimum to a destination terminal, whereby loads on the home agent 90 can be significantly reduced in comparison with the configuration of FIG. 1.

In the case where capsulated packets are communicated between the packet switches 91 and the base station controllers 60 to 80, the packet switches 91 may have, at the base station controller side, communication interfaces each provided with a function of capsulating transmission packets and decapsulating received packets.

In the above-described embodiment, when a communication quality information request packet was received from the monitoring node 50, each base station repeats the transmission of communication quality information for each wireless terminal after notifying the monitoring node 50 of throughput information. However, each base station may transmit the communication quality information collectively for a plurality of terminals. Further, each base station may notify the monitoring node of the communication quality information of a plurality of terminals together with the throughput information at a time.

In the above embodiment, the home agent stores in the management table the ID information of wireless communication method in association with the correspondence between NAI and HoA of wireless terminals, so that when a request to assign HoA to a wireless terminal is received, it can determine whether the HoA has already been assigned to NAI indicated in the request. However, HoA may be assigned to each wireless terminal by a user authentication server omitted in FIG. 1, in place of the home agent 90.

In an embodiment that uses the user authentication server, before connecting a wireless terminal to the Internet, the authentication server collates user authentication information, such as user ID and password, transmitted from the wireless terminal with a user ID and password previously registered. If the user authentication information is correct, the user authentication server assigns HoA to the wireless terminal and stores the correspondence between the assigned HoA and the user ID. The HoA assigned to the wireless terminal is notified to a base station controller by a response message indicating the authentication result. When a wireless terminal having already been assigned HoA transmits a connection request by another communication method, the authentication server notifies the base station controller of HoA that was already assigned and stored in association with a user ID.

For example, in the case where the wireless terminal 10 establishes a wireless communication path of 1xEV-DO, the 1xEV-DO base station controller 60 notifies the home agent 90 of the HoA in the 1xEV-DO connection information exchange (SQ05). In this embodiment, the home agent 90 stores in the management table the ID of wireless communication method in association with HoA notified from the 1xEV-DO base station controller. After that, when the wireless terminal 10 establishes a wireless communication path of Wi-Fi, the Wi-Fi base station controller 70 notifies the home agent 90 of the HoA in the Wi-Fi connection information exchange (SQ16). The home agent 90 stores in the management table the ID of wireless communication method in association with HoA notified from the Wi-Fi base station controller 70. In similar to this, when the wireless terminal 10 establishes a wireless communication path of WiMAX, the home agent 90 stores in the management table the ID of the wireless communication method in association with HoA notified from the WiMAX base station controller 80.

In the case of this embodiment, the authentication server can assign an identical HQA to the wireless terminal in accordance with a user ID. Since the home agent 90 is sufficient to store the ID of wireless communication method (or the ID of a base station controller) in association with HoA notified from the base station controller 80, each wireless terminal need not notify the value of NAI to the home agent by a connection request.

In the above-described embodiments, a description has been made of an example in which the monitoring node selects the optimum communication path for each wireless terminal based on communication quality information collected from a plurality of base stations. The monitoring node of the present invention is effective for central management of information collected from a plurality of base stations or a plurality of base station controllers different in communication method, and applicable to the collection and analysis of various statistical information and accounting information.

What is claimed is:

1. A wireless communication system comprising:
a plurality of base station controllers utilizing multiple wireless communication methods and each accommodating a plurality of base stations;
a monitoring node; and
a home agent apparatus connected to the plurality of base station controllers;
wherein the monitoring node includes:
correspondence information included in a first terminal identifier and a plurality of second terminal identifiers, wherein the first terminal identifier is used to identify a terminal at the home agent apparatus and the plurality of second terminal identifiers are used to identify the terminal for each wireless communication method; and
a processor that
adds, to the correspondence information, communication quality information for each wireless communication method, wherein the communication quality information varies over time and is received from each base station,
identifies the communication quality information for each wireless communication method by associating the first terminal identifier and the plurality of second identifiers, and determines one of the multiple wireless communication methods based on the identified communication quality information, wherein: throughput information for each wireless communication method is received from each of the base stations, and the processor also determines the one of the multiple wireless communication methods based on the throughput information.

2. The wireless communication system according to claim 1, wherein the plurality of second terminal identifiers to be used by each of the base stations is one of Unicast Access Terminal Identifier, IP address for IPsec, and MAC address that are assigned to the terminal, and the first terminal identifier to be used by the home agent apparatus is an IP address assigned to the terminal as a home address.

3. The wireless communication system of claim 1, wherein
the processor notifies the home agent apparatus of the determined wireless communication method, and
the home agent apparatus communicates to the terminal via one of the plurality of base stations and one of the plurality of the base station controllers corresponding to the determined wireless communication method.

4. The wireless communication system according to claim 1, wherein the monitoring node receives the first terminal identifier and the plurality of second terminal identifiers from at least one of the base stations and one of the base station controllers.

5. A monitoring apparatus connected to a home agent apparatus, a plurality of base control stations, and a plurality of base station controllers, wherein the plurality of base control stations utilize multiple wireless communication methods and the plurality of base station controllers utilize multiple wireless communication methods, comprising:
correspondence information included in a first terminal identifier and a plurality of second terminal identifiers, wherein the first terminal identifier is used to identify a terminal at the home agent apparatus and the plurality of second identifiers are used to identify the terminal for each wireless communication method; and
a processor that
adds, to the correspondence information, communication quality information for each wireless communication method, wherein the communication quality information varies over time and is received from each base station, identifies the communication quality information for each wireless communication method by associating the first terminal identifier and the plurality of second identifiers, and
determines one of the multiple wireless communication methods based on the identified communication quality information, wherein:
throughput information for each wireless communication method is received from each of the base stations, and
the processor also determines the one of the multiple wireless communication methods based on the throughput information.

6. The monitoring apparatus system of claim 5, wherein the processor notifies the home agent apparatus of the determined communication method.

7. The monitoring apparatus according to claim 5, wherein the monitoring node receives the first terminal identifier and the plurality of second terminal identifier from at least one of the base stations and one of the base station controllers.

8. The monitoring apparatus according to claim 5, wherein the plurality of second terminal identifiers to be used by each of the base stations is one of Unicast Access Terminal Identifier, IP address for IPsec, and MAC address that are assigned to the terminal, and the first terminal identifier to be used by the home agent apparatus is an IP address assigned to the terminal as a home address.

9. A wireless communication method for communicating from a mobile terminal to other terminals via a home agent apparatus, a plurality of base stations, a plurality of base station controllers, and a monitoring node, wherein the plurality of base control stations utilize multiple wireless communication methods and the plurality of base station controllers utilize the multiple wireless communication methods, comprising:

including correspondence information included in a first terminal identifier and a plurality of second terminal identifiers, wherein the first terminal identifier is used to identify a terminal at the home agent apparatus and the plurality of second identifiers are used to identify the terminal for each wireless communication method at the monitoring node;

adding, to the correspondence information, communication quality information for each wireless communication method, wherein the communication quality information varies over time and is received from each base station;

identifying the communication quality information for each wireless communication method by associating the first terminal identifier and the plurality of second identifiers, and determining one of the multiple wireless communication methods based on the identified communication quality information, wherein:

throughput information for each wireless communication method is received from each of the base stations, and the one of the multiple wireless communication methods is also determined based on the throughput information.

* * * * *